US006333097B1

(12) United States Patent
Go et al.

(10) Patent No.: US 6,333,097 B1
(45) Date of Patent: Dec. 25, 2001

(54) DIMENSIONALLY STABLE ORIENTED STRAND BOARD (OSB) AND METHOD FOR MAKING THE SAME

(75) Inventors: Andrew Go, Kirkland (CA); Wallace S. Pettersen, Bagley, MN (US); Alain Laplante, Senneterre (CA)

(73) Assignee: Nexfor Inc., Toronto (CA)

( * ) Notice: Subject to any disclaimer, the term of this patent is extended or adjusted under 35 U.S.C. 154(b) by 0 days.

(21) Appl. No.: 09/564,674

(22) Filed: May 4, 2000

Related U.S. Application Data

(62) Division of application No. 09/042,715, filed on Mar. 17, 1998, now Pat. No. 6,098,679.

(51) Int. Cl.[7] .......... B23B 7/02

(52) U.S. Cl. .......... 428/213; 428/156; 428/170; 428/220; 428/537.1

(58) Field of Search .......... 428/294, 337, 428/339, 106, 109, 110, 220, 537.1, 105, 114, 218, 156, 170, 172, 213

(56) References Cited

U.S. PATENT DOCUMENTS

| | | | |
|---|---|---|---|
| 3,173,460 | 3/1965 | Hann | 144/309 |
| 4,017,980 | 4/1977 | Kleinguenther | 34/13.4 |
| 4,058,906 | 11/1977 | Pagnozzi | 34/16.5 |
| 4,198,763 | 4/1980 | Kurihara | 34/16.5 |
| 4,218,832 | 8/1980 | Daniels | 34/79 |
| 4,223,451 | 9/1980 | Pagnozzi et al. | 34/16.5 |
| 4,233,752 | 11/1980 | Kleinguenther | 34/9.5 |
| 4,246,704 | 1/1981 | Pagnozzi et al. | 34/16.5 |
| 4,293,509 * | 10/1981 | Bucking | 264/26 |
| 4,311,621 | 1/1982 | Nishizawa et al. | 260/17.2 |
| 4,343,095 | 8/1982 | Rosen et al. | 34/16.5 |
| 4,467,532 | 8/1984 | Drake | 34/16.5 |
| 4,684,489 | 8/1987 | Walter | 264/101 |
| 4,893,415 | 1/1990 | Moldrup | 34/16.5 |
| 5,392,530 * | 2/1995 | Izumi | 34/404 |
| 5,447,686 | 9/1995 | Seidner | 422/26 |
| 5,525,394 * | 6/1996 | Clarke et al. | 428/105 |
| 5,538,676 | 7/1996 | Bielfeldt | 264/109 |
| 5,578,274 | 11/1996 | Seidner | 422/111 |
| 5,647,934 | 7/1997 | Vaders et al. | 156/219 |

* cited by examiner

*Primary Examiner*—Merrick Dixon
(74) *Attorney, Agent, or Firm*—Katten Muchin Zavis

(57) ABSTRACT

The present invention is concerned with a method for obtaining a wood panel, preferably an OSB panel, with significantly reduced thickness swelling properties when exposed to or contacted with moisture or water. The novel dimensionally stable panels are obtained by an alternate vacuum—steam injection method. The method is an after-fabrication, or post-treatment method, and involves one or more cycles of applying a vacuum followed by injection of hot steam in a sealed treatment chamber.

12 Claims, 2 Drawing Sheets

Surface layer of Untreated OSB

Surface layer of stabilized OSB

DIMENSIONALLY STABLE ORIENTED STRAND BOARD (OSB) AND METHOD FOR MAKING THE SAME

This application is a divisional of application Ser. No. 09/042,715, filed Mar. 17, 1998, now allowed, now U.S. Pat. No. 6,098,679.

FIELD OF THE INVENTION

The present invention relates to wood boards or panels, and more specifically to oriented strand boards (OSB), which have been treated with steam and vacuum alternately, to obtain a dimensionally stable board which exhibits reduced swelling characteristics in the presence of water or moisture.

BACKGROUND OF THE INVENTION

Oriented strand board is a wood-based construction sheathing product comprised of wood strands that are sliced from logs, dried, mixed with relatively small quantities of wax and resin, typically less than 3.5% by total weight, formed in mats with orientation of the wood strands controlled in the length and width directions. The mats are then pressed under heat and pressure, and thermosetting polymeric bonds are created, binding together the adhesive and wood strands to achieve rigid, structural grade panels. It is during this pressing and consolidation process that the wood is compressed by a factor of 1.35 to 1.70 times its original density. The final panels are dry when made. When used in construction, they will often take on moisture from ambient air and/or precipitation, thus exerting swelling forces on the panel as it attempts to regain its natural form and density.

Wood panels, and more particularly OSB, are omnipresent in the building industry. In recent years, the market of OSB panels has significantly increased with the displacement of plywood panels in construction markets due to the fact that the structural performance of OSB can match that of plywood, at a lower cost. However, because of their composition and manufacturing process, OSB panels have one recognized disadvantage: the panels swell in thickness when they come in contact with water or moisture. In the initial wetting cycle, following manufacture, most of this swelling is irreversible. Plywood, also a manufactured wood panel, does not exhibit thickness swelling to the same extent as OSB. The major difference is that the wood elements used to make plywood, i.e., veneers, are not densified to any great extent in the manufacturing process, and therefore, compressive stress is minimized.

This characteristic differential in swelling properties is evident in building construction, where panels can be exposed to the elements during construction. OSB will tend to exhibit more evidence of thickness swell perpendicular to the panel face, including edge flaring, than plywood. This creates the impression of an inferior product, even though OSB's structural performance properties are still intact. A standard test in the wood panel industry to measure the completeness of cure of the wood/glue bonds is to place a sample in boiling water for 2 hours. This also creates extreme conditions for swelling of the wood elements in the panels. Experiments show that the thickness of an-OSB panel ranging from ¼" to ¾" tested under these conditions, although it remains sound with structural integrity intact, will increase by 40%–60%, compared to its original thickness, and that this swelling is substantially irreversible. Plywood, on the other hand, swells less than 10% in a similar situation.

The swelling characteristics of OSB can be altered during manufacture, with use of more resin binders, or longer press time. However, in every instance, this adds significantly to the cost, with marginal improvements.

U.S. Pat. No. 3,173,460 (Hann) discloses a particleboard exposed to steam at a pressure between 30 and 100 psi while the board is restrained for a period of 1 to 10 minutes at temperatures between 135–170° C. to prevent swelling. The treated board is then dried to a moisture content of less than 4%.

U.S. Pat. No. 4,893,415 (Moldrup et at.) describes a method of removing moisture from wood and wood-based products, i.e., a drying process, by first removing air in the drying chamber and then injecting superheated steam. Layers of the wood or wood-based products are disposed in a chamber and the layers are separated by beams, thus leaving empty spaces therebetween.

U.S. Pat. No. 4,017,980 (Kleinguenther) discloses a process and apparatus for drying fibrous materials under controlled conditions. The chamber comprises means to apply mechanical pressure to the materials and also apertures or openings used for the injection of steam or for creating a vacuum. Sheets or panels of any dimensions can be placed between plates and a predetermined force is applied.

In U.S. Forest Service Research Note FPL-0187, March 1968, Heebink et al. teach the post-treatment of stacks of phenolic resin-bonded particleboard with steam. The authors state that a 10 minutes post-treatment with steam at a temperature between 150 and 180° C. reduced swelling and springback of panels treated thereby. The steaming treatment is said to be more effective without restraint against increase in thickness than with restraint or over-restraint.

In view of the above, it is apparent that there is a great need to develop a novel method for making dimensionally stable wood panels, and more particularly OSB, that could sustain prolonged exposure to water or moisture without showing significant swelling and not affecting the structural and physical properties of the panels.

SUMMARY OF THE INVENTION

In accordance with the present invention, there is now provided a method for making a dimensionally stable wood panel, preferably OSB, comprising the steps of:

a) restraining at least one panel within restraining means in a sealed chamber;

b) applying a vacuum in the chamber, c) injecting steam under pressure in the chamber to release stress within the panel;

d) removing the steam from the chamber; and e) optionally repeating steps b) to d) at least once, whereby both lignin and hemicellulose contained in the wood are modified, resulting in a dimensionally stable panel with significantly reduced swelling in the presence of water or moisture.

Panels treated in accordance with the present method exhibit swelling of less than 5%, based on original thickness after 24-hour cold soak (ASTM 1037 standard test) and less than 20% after a two-hour boil test (ASTM 1037 standard test), and most of this swelling is reversible on drying.

The present method is most advantageous for treating OSB wood panels of any manufactured thickness. The standard length and width are 8' by 4', but any size can be treated, limited only by the dimensions of the treatment chamber.

IN THE DRAWINGS

DETAILED DESCRIPTION OF THE INVENTION

The present invention is concerned with a method to achieve significant improvement in thickness stabilization of OSB panels by treatment with vacuum and pressurized steam cycles following the manufacturing process. The method provides for the significant reduction of thickness swelling of wood panels, specifically OSB, resulting from exposure or contact with moisture or water. This unique approach to obtain dimensionally stable panel is achieved by alternating vacuum and high pressure steam injection cycles. The method is carried out after the panels are manufactured, and involves at least one cycle of vacuum followed by injection of high pressure steam in a sealed chamber.

High pressure steam injection is provided to achieve rapid and extreme heat transfer within the panel. During the steaming step, there is a quick and substantially uniform rising of the temperature of the panel. Steam injection and uniform temperature rise in the panels are believed to facilitate the relaxation of the built up internal stresses in wood by causing changes in the elemental wood structure (slippage) as wood components exceed their glass transition or flow temperatures, i.e., lignin flow. The end result is therefore a dimensionally stable product highly resistant to swelling.

With respect to the conditions suitable for the present invention, they include a post manufacture treatment of a stack of panels by first creating a vacuum in a sealed chamber and then injecting high pressure steam into the chamber under vacuum wherein the stack is restrained mechanically to prevent swelling of the panel thickness, i.e., perpendicular to the plane of their surfaces, during the treatment. Vacuum may vary from about 10 to 25 inches of Hg. Steam may be applied at a pressure preferably between about 30 to 200 psig, achieving temperatures in a range between 135 to 195° C. Each steam treatment step is preceded and optionally followed by a vacuum step to quickly remove steam. The duration of the steam treatment may vary from 5 to 30 minutes, and that of a vacuum step may vary from 3 to 10 minutes. To ensure that full benefits of the present method are obtained, at least one cycle comprised of vacuum, followed by steam injection, must be performed. Subsequent cycles may be needed depending on the completeness of the steam penetration on the first cycle.

Figure 3:
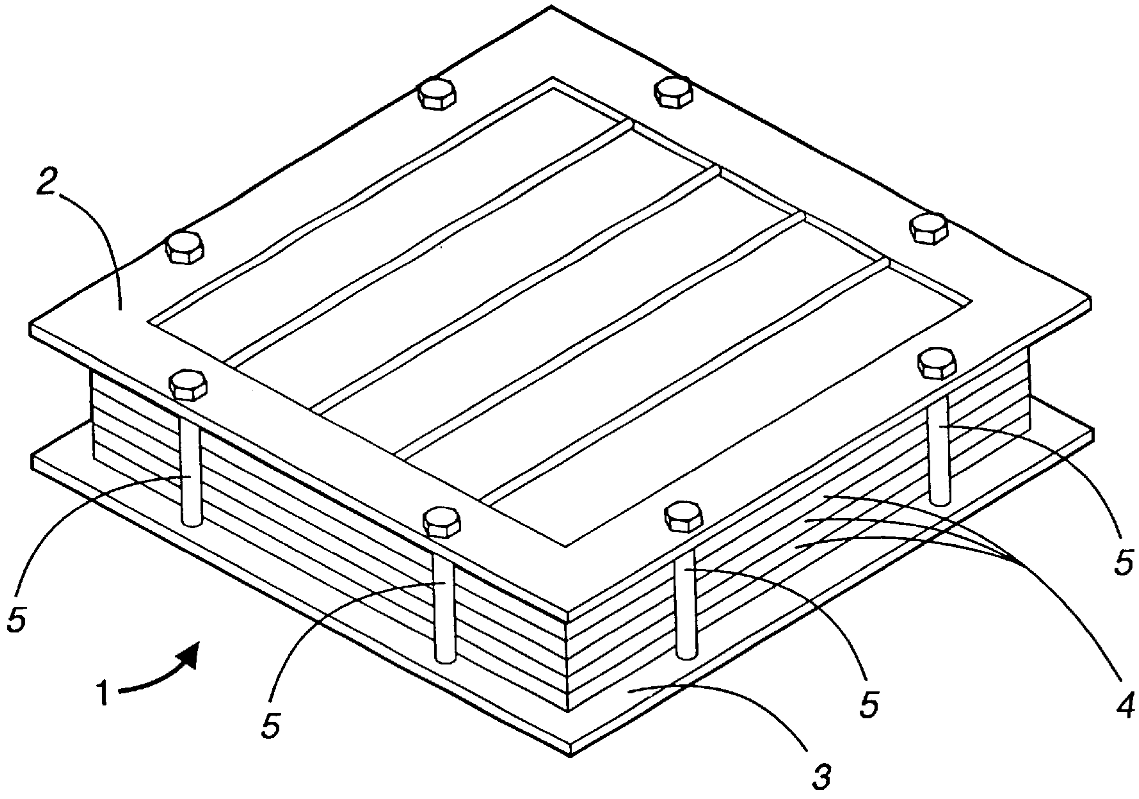
FIG. 3 illustrates an example of a stack of panels under restraint for the purpose of the present method.

Typically, a stack of at least 5 up to a full lift quantity of panels is placed in a device as illustrated in FIG. 3, designed to restrain swelling perpendicular to the plane of the panel faces during treatment. Generally the restraining device 1 is comprised of two metal plates 2 and 3 and within which the stack of panels 4 are inserted with the face of the panel in contact with the face of the metal plates. A restraining force is applied by means of a frame and a series of bolted rods 5 in tension or hydraulic force to limit swelling of the panels in the direction perpendicular to their faces during treatment. Restraining device may be placed on a cart, wagon or any other movable means and rolled in the treatment chamber. Other suitable methods of restraint may also be used as long as restraint is applied in such a manner as to resist swelling pressures during treatment.

In order to optimize the efficiency and uniformity of the present invention, a thin screen (not shown), typically but not limited to ¼" mesh, and of 1/16" to ⅛" thick is inserted between the panels to provide a gap to release air and/or allow steam penetration. The direct effect of the presence of such thin screen is that pressure and vacuum cycles may be minimized, processing time reduced and uniformity of treatment enhanced. Other forms of embossed or profiled metal plate inserts may also be used in place of the screen to achieve the same effect, provided that such insert does not have detrimental effects on the panels during treatment.

The stacked and restrained panels are placed inside a sealed chamber. The chamber must be strong enough to resist vapour pressure of up to 200 psig and includes at least one pipe comprising a plurality of apertures to provide the steam supply which is controlled by a pressure release valve. In the same manner, at least one more pipe is connected to a vacuum pump and comprising a plurality of apertures to allow evacuation of steam. Any other effective means of injecting the steam and creating vacuum in the chamber, to achieve the required treatment conditions can be used. Such means can be easily determined by any one of ordinary skill in the art.

Sequences of vacuum and high pressure steam cycles are then applied in the sealed chamber. Vacuum is first applied to evacuate the air from the chamber and from the panels, thus facilitating enhanced steam penetration. The restrained panels may be exposed to one or more cycles of vacuum—high pressure steam injection steps. The number of vacuuming and steaming steps, and pressure and time needed is determined by the size of the panels, number of panels stacked, panel thickness, density and the success criterion, i.e., thickness swell target after wetting or via standard ASTM water soak or boil tests.

Mechanism of the Steam Treatment Process

It is well known in the field that the main cause for the springback phenomenon is the densification of the wood elements during pressing attempts to return to their original form. Wood is hygroscopic in nature. When exposed to water or moisture, the panels tend to adsorb moisture. The wood elements swell and release the built-up stresses in an attempt to return to their original form and density, thus causing thickness swell that is irreversible on subsequent drying. The present method of stabilization achieves release of a substantial portion of this stress while the panels are held under restraint to prevent swelling during treatment. It is a requisite in the present method that the panels be restrained during the performance of the method, because the swelling average of the panels in the chamber under such conditions would be in excess of 30% if no restraint were applied.

Figure 1:
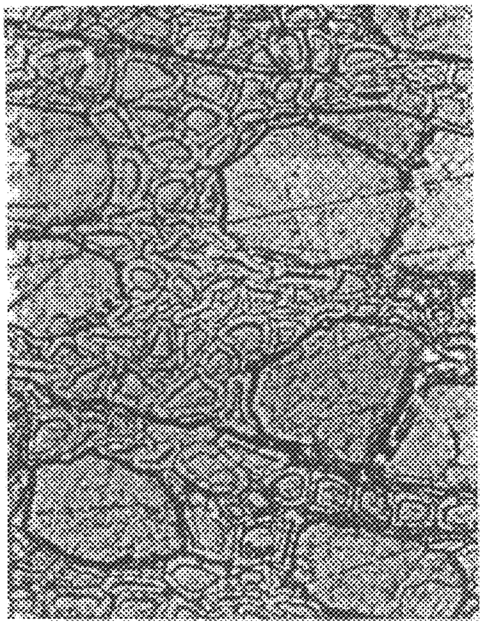
FIG. 1 illustrates the surface layer of a conventional untreated OSB panel.
Figure 2:
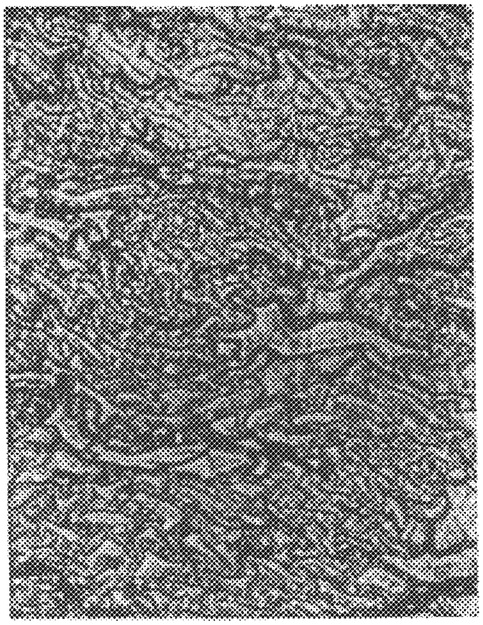
FIG. 2 illustrates the surface layer of an OSB panel treated according to the method of the present invention.

As a result of this treatment, there are changes in the wood structure, which can be examined under the microscope, as illustrated in FIGS. 1 and 2. The surface layers of an OSB panel after being treated according to the present method shows compression, deformation and slippage of the higher density surface layers (see FIG. 2), while it is not the case for an untreated panel (see FIG. 1).

Other evidence for these structural changes at the cellular level is found in the chemical analysis of the hemicellulose and lignin chains. Analysis reveals that there is a modification, probably a partial depolymerization, of both lignin and hemicellulose as evidenced by increase in the extractable wood components. As shown in Table 1, when analyzed through a conventional sodium hydroxide solubility test (TAPPI 212om-93,) an OSB panel treated in accordance with the present method contains almost twice as much extractive components compared to a regular untreated panel.

TABLE 1

| % of extractives in OSB panels - 1% NaOH solubility | |
|---|---|
| Untreated panel | Vacuum - steam treated panel |
| 18.2% | 35.4% |

EXAMPLES

Example 1

Single Panel Steam-Heat Treatment with Restraint

A piece of 21" by 23" of commercial OSB panel of 23⁄32" thickness is treated by steam in a press with steam injection capability. The press consists of a modified hot press in which the upper and lower platens have apertures that are connected to both the steam supply and vacuum. After placing the press in a sealed chamber, 10 to 25 inch Hg vacuum is applied to remove air from the panel, followed by steam injection at a pressure of 150 or 200 psi for 1 minute. A second vacuum is then created to remove steam condensate from the panel and to equilibrate to atmospheric pressure quickly. Table 2 summarizes four experiments where OSB panels are treated according to these conditions. Their dimensional stability is demonstrated by the improved thickness swell after two-hour boil compared to untreated panels. The mechanical properties of the treated panels appear in Table 3.

TABLE 2

Single panel steam-heat treatment

| Sample # | Pressure (psi) | Treatment sequence* | Average ThS** after 2 hour boil (%) |
|---|---|---|---|
| 1 | Untreated | — | 45–60 typically |
| 2 | 150 | V1-S4-V1 | 18 |
| 3 | 150 | V1-S7-V1 | 17 |
| 4 | 200 | V1-S4-V1 | 12 |
| 5 | 200 | V1-S7-V1 | 11 |

*V1-S4-V1: 25" Hg vacuum for 1 min; steam for 4 min; 10" Hg vacuum for 1 min.
**ThS: Average thickness swell of several samples

TABLE 3

Mechanical properties of OSB panel - Single panel steam-heat treatment

| Sample # | Internal bond (psi) | Modulus of rupture (psi) | Modulus of elasticity (x $10^{-3}$ psi) |
|---|---|---|---|
| 1 | 30–50* | 3500–4500* | 700–900* |
| 2 | 38 | 4600 | 980 |
| 3 | 38 | 4100 | 941 |
| 4 | 34 | 3100 | 830 |
| 5 | 34 | 2670 | 800 |

*Range of properties typical of untreated commercial panels

Example 2

Multiple Panel Under Restraint with Multiple Vacuum and Steam Cycles

A stack of five 15"×15" commercial OSB panels of 23⁄32" thickness is treated under restraint in a sealed chamber similar to that described in Example 1 above, with the addition of heating to maintain a temperature sufficiently high to prevent accumulation of water condensate. The five panels are placed between two metal plates bolted together to prevent panel swelling during the treatment. The method entails alternating vacuum and steam cycles where the specifics are dependent on thickness swell target desired. Table 4 summarizes the treatment parameters of some typical experiments and the corresponding improvements in dimensional stability in terms of 2-hour boil thickness swell. Table 5 illustrates the mechanical properties of the treated panels.

TABLE 4

Multiple panel steam-heat treatment

| Sample # | Pressture (psi) | Treatment sequenee | Average ThS after 2 hour boil (%) |
|---|---|---|---|
| 1 | Untreated | — | 45–60 typically |
| 2 | 150 | V3-S10 | 11* |
| 3 | 150 | V10-S18 | 11* |
| 4 | 50 | V3-S6-V3-S12 | 38 |
| 5 | 50 | V3-S6-V3-S12 | 16 |
| 6 | 100 | V3-S9-V3-S9 | 14 |
| 7 | 100 | V3-S6-V3-S12 | 11 |
| 8 | 150 | V3-59-V3-S9 | 11 |
| 9 | 150 | V3-S3-V3-S15 | 9 |
| 10 | 200 | V3-S6-V3-S12 | 9 |

*Non-uniform treatment of the panels in the stack; as a result, white spots appeared on some panels

TABLE 5

Mechanical properties of OSB panel - Multiple panel steam-heat treatment

| Sample # | Internal bond (psi) | Modulus of rupture (psi) | Modulus of elasticity (x $10^{-3}$ psi) |
|---|---|---|---|
| 1 | 30–50 | 3500–4500 | 700–900 |
| 4 | 57 | 4100 | 750 |
| 5 | 48 | 3600 | 770 |
| 6 | 39 | 3000 | 570 |
| 7 | 42 | 3700 | 840 |
| 8 | 39 | 3100 | 570 |
| 9 | 34 | 3150 | 660 |
| 10 | 35 | 3700 | 810 |

Example 3

Multiple Vacuum & Steam Cycles on Multiple Panels with Inner Tube

A stack of five 15" by 15" commercial OSB panels of 23⁄32" thickness are heat treated with steam under Faint in a sealed chamber. The chamber and apparatus are the same as in Example 2, except that a ¼" inner tube is placed in a drilled hole in the longitudinal section of panel #3 (middle panel) leading to the centre of the stack. The purpose of the tube is to allow evacuation of air and other gaseous materials from the stack during the vacuum-steam treatment. The inner tube is connected through couplings and lead to outside the chamber. A valve is placed at the end, and when opened, facilitates steam and other gaseous materials to leave the panel through the centre of the stack. Table 6 summarizes a few examples highlighting the parameters of the treatment and the resultant panel thickness swell results using this set-up.

TABLE 6

Multiple panel steam-heat treatment with inner tube

| Sample # | Pressure (psi) | Treatment sequence | Average ThS after 2 hour boil (%) |
|---|---|---|---|
| 1 | Untreated | — | 45–60 typically |

TABLE 6-continued

Multiple panel steam-heat treatment with inner tube

| Sample # | Pressure (psi) | Treatment sequence | Average ThS after 2 hour boil (%) |
|---|---|---|---|
| 2 | 150 | V3-S20* | 11 |
| 3 | 150 | V1-S20* | 11 |
| 4 | 150 | V1-S16-E2** | 13 |

*steam for 20 min. with continuous exhaust
**steam for 16 min. with exhaust every 2 minute Example 4

Multiple Vacuum & Steam Cycles on Multiple Panels with Screen Insert

A stack of 45 commercial OSB panels 8" by 4" of 23/32" thickness are heat treated with steam under restraint in a pressure vessel. The panels are individually separated with fine mesh screens inserted to facilitate steam penetration and heat transfer. Table 7 summarizes the treatment parameters of some typical experiments and the corresponding improvements in dimensional stability in terms of 2-hour boil thickness swell.

TABLE 7

Multiple panel steam-heat treatment with screens

| Sample # | Pressure (psi) | Treatment Sequence | Average ThS after 2 hour boil (%) |
|---|---|---|---|
| 1 | Untreated | — | 45–60 typically |
| 2 | 120 | V5-S3-V3-S15 | 13 |
| 3 | 100 | V5-S3-V3-S15 | 15 |
| 4 | 80 | V5-S3-V3-S15 | 19 |

In the present method, both lignin and hemicellulose contained in the wood are modified, resulting in a dimensionally stable panel with significantly reduced swelling in the presence of water or moisture. Panels so treated will swell less than 5% based on original thickness after 24 hour cold water soak (ASTM D1037), or less than 20% after a two-hour boiling water test (ASTM D1037), with most of this swelling, reversible on drying.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A dimensionally stable wood panel exhibiting a thickness swelling of not more than 20% of original thickness when boiled for 2 hours in water, or of not more than 5% when soaked in cold water for 24 hours, when tested in accordance with ASTM Standard D1037 methods.

2. A panel according to claim 1 wherein the panel is an OSB panel.

3. A panel according to claim 1, wherein the wood panel comprises wood wherein both lignin and hemicellulose are modified.

4. A dimensionally-stable OSB wood panel, wherein:

the wood panel comprises wood in which both lignin and hemicellulose are modified;

the wood panel exhibits a thickness swelling of less than or equal to about 20% of original thickness when boiled in water for two hours, when tested in accordance with ASTM Standard D1037 methods; and the wood panel exhibits a thickness swelling of less than or equal to about 5% of original thickness when soaked in cold water for 24 hours, when tested in accordance with the ASTM Standard D1037 methods.

5. A panel according to claim 4, wherein the wood panel comprises wood wherein both lignin and hemicellulose are vacuum-and-steam-modified.

6. A panel according to claim 4, wherein the wood panel comprises at least one surface layer having a wood structure that shows compression, deformation, and slippage of higher density surface layers.

7. A panel according to claim 4, wherein the wood panel, when analyzed through a sodium hydroxide solubility test TAPPI 212om-93, comprises greater than 30% extractive components.

8. A panel according to claim 4, wherein the wood panel comprises at least one surface layer having a wood structure that shows structural changes at the cellular level.

9. A panel according to claim 4, wherein the both lignin and hemicellulose are structurally modified.

10. A dimensionally-stable OSB wood panel, wherein: the wood panel comprises wood in which both lignin and hemicellulose are structurally modified such that a wood panel surface layer has a wood structure that exhibits compression and deformation; the wood panel exhibits a thickness swelling of less than or equal to about 20% of original thickness when boiled in water for two hours, when tested in accordance with ASTM Standard D1037 methods; and the wood panel exhibits a thickness swelling of less than or equal to about 5% of original thickness when soaked in cold water for 24 hours, when tested in accordance with the ASTM Standard D1037 methods.

11. A panel according to claim 10, wherein the wood panel, when analyzed through a sodium hydroxide solubility test TAPPI 212om-93, comprises greater than 30% extractive components.

12. A panel according to claim 10, wherein the wood panel comprises at least one surface layer having a wood structure that shows structural changes at the cellular level.

* * * * *